United States Patent
Schedevy

(10) Patent No.: US 7,315,729 B2
(45) Date of Patent: Jan. 1, 2008

(54) WIRELESS TRANSMITTER FOR USE IN A VEHICLE

(75) Inventor: George C. Schedevy, Aquebogue, NY (US)

(73) Assignee: Audiovox Corporation, Hauppauge, NY (US)

(*) Notice: Subject to any disclaimer, the term of this patent is extended or adjusted under 35 U.S.C. 154(b) by 139 days.

(21) Appl. No.: 10/750,070

(22) Filed: Dec. 31, 2003

(65) Prior Publication Data

US 2005/0143880 A1  Jun. 30, 2005

(51) Int. Cl.
*H04B 1/034* (2006.01)

(52) U.S. Cl. ............... 455/99; 701/24; 381/86; 709/219; 386/125; 348/837

(58) Field of Classification Search ............ 455/20, 455/99; 725/75; 381/79, 86; 701/24; 709/219; 386/125; 348/837
See application file for complete search history.

(56) References Cited

U.S. PATENT DOCUMENTS

| | | | |
|---|---|---|---|
| 4,712,250 A | 12/1987 | Michels et al. ............ 455/20 |
| 5,319,716 A | 6/1994 | McGreevy ............... 381/79 |
| 5,970,390 A | 10/1999 | Koga et al. ............... 455/42 |
| 6,591,085 B1 | 7/2003 | Grady ...................... 455/42 |
| 2002/0059368 A1* | 5/2002 | Reynolds ................ 709/203 |
| 2003/0053378 A1 | 3/2003 | Lovin et al. .............. 369/7 |
| 2003/0226148 A1* | 12/2003 | Ferguson ................. 725/75 |
| 2004/0151327 A1* | 8/2004 | Marlow ................... 381/86 |
| 2004/0234081 A1* | 11/2004 | Brice et al. .............. 381/86 |
| 2005/0123147 A1* | 6/2005 | Everett et al. ............ 381/79 |

* cited by examiner

Primary Examiner—Joseph Feild
Assistant Examiner—Pierre-Louis Desir
(74) Attorney, Agent, or Firm—F. Chau & Assoc., LLC

(57) ABSTRACT

A connecting device comprises a first power plug for connecting to a power output port of a vehicle, a second power plug for connecting to a power input port on an electronic device, at least one signal plug for connecting to at least one signal output port of the electronic device, wherein visual signals and audio signals are received by the connecting device through the at least one signal plug, and a wireless transmitter for wirelessly transmitting the visual signals and the audio signals to a receiver in the vehicle.

21 Claims, 4 Drawing Sheets

WIRELESS TRANSMITTER FOR USE IN A VEHICLE

BACKGROUND OF THE INVENTION

1. Technical Field

The present disclosure relates to a wireless transmitter for use in a vehicle, and more particularly to a wireless transmitter capable of wireless transmission of audio signals and visual signals.

2. Discussion of the Related Art

As society has become more mobile, demand has increased for electronic appliances and devices operable in vehicles. For example, video display devices, video cassette players (VCPs) and digital video disc (DVD) players have been provided in vehicles for video entertainment while traveling.

A video entertainment system may be permanently mounted in a vehicle. However, it is also desirable to connect a portable electronic device, such as a portable video compact disc (VCD) player or a DVD player, to a vehicle's power supply and to an existing sound system in the vehicle.

Devices are known for connecting a portable audio device, such as a compact disc (CD) player, to a vehicle's sound system, whereby audio signals from the CD player can be wirelessly transmitted to a receiver on the vehicle for broadcast through, for example, the vehicle's radio. Some of the known connecting devices use a vehicle's power supply through a connection to a power port, such as a cigarette lighter.

It has also become popular to display text on a display portion of, for example, a radio. The text may include, for example, information such as names of songs and artists. Text signals may be synchronized with audio and video signals and stored on a CD or a DVD along with audio and video signals.

Therefore, it may be desirable to transmit text signals from a portable entertainment device for broadcast on a display of a vehicle's sound system.

Accordingly, a need exists for a connecting device that utilizes a vehicle's power supply and can be used in conjunction with a portable video or audio player, to wirelessly transmit audio and text signals to an existing entertainment system in a vehicle for broadcast thereon.

SUMMARY OF THE INVENTION

A connecting device, according to an embodiment of the present invention, comprises a first power plug for connecting to a power output port of a vehicle, a second power plug for connecting to a power input port on an electronic device, at least one signal plug for connecting to at least one signal output port of the electronic device, wherein visual signals and audio signals are received by the connecting device through the at least one signal plug, and a wireless transmitter for wirelessly transmitting the visual signals and the audio signals to a receiver in the vehicle.

The power from the vehicle may be supplied to the power input port of the electronic device via the first power plug and the second power plug. The electronic device may be at least one of a digital video disc player, a video compact disc player, a compact disc player, and an MP3 player. The visual signals and the audio signals may be stored on at least one of a digital video disc, a video compact disc, a compact disc, and a computer file. The visual signals may be synchronized with at least one of the audio signals and video signals.

The connecting device may further comprise a frequency selector for selecting a frequency on which the visual signals and the audio signals are wirelessly transmitted. The selected frequency may range from about 88 MHz to about 108 MHz or from about 88 MHz to about 225 MHz. The receiver may be tuned to the selected frequency.

The receiver may be at least one of an FM radio, a digital radio, and a display unit coupled to an antenna of the vehicle. The receiver may include a display for displaying visual information.

The connecting device may further comprise a multiplexer for multiplexing the audio signals and the visual signals, and a modulator for modulating the visual signals and the audio signals onto a predetermined frequency for wireless transmission at the predetermined frequency. The wireless transmitter may include at least one of an FM transmitter and a digital broadcast transmitter. The visual signals may include at least one of text, graphics and video.

Another connecting device, in accordance with an embodiment of the present invention, comprises a means for connecting to a power supply of a vehicle, a first means for connecting to an electronic device, whereby power is supplied from the power supply to the electronic device, a second means for connecting to the electronic device, whereby visual signals and audio signals from the electronic device are received by the connecting device, and a transmission means for wirelessly transmitting the visual signals and the audio signals to a receiver in the vehicle.

The connecting device may further comprise a means for selecting a frequency on which the visual signals and the audio signals are wirelessly transmitted. The receiver may be at least one of an FM radio, a digital radio and a display unit installed in the vehicle. The connecting device may further comprise a means for multiplexing the audio signals and the visual signals, and a means for modulating the visual signals and the audio signals onto a predetermined frequency for wireless transmission at the predetermined frequency. The transmission means may include at least one of an FM transmitter and a digital broadcast transmitter.

A wireless transmitter for use in a vehicle, in accordance with an embodiment of the present invention, comprises a connector for connecting to an output port of an electronic device, wherein the wireless transmitter receives audio signals and visual signals through the connector, and one of an FM transmitter and a digital broadcast transmitter for wirelessly transmitting the audio signals and the visual signals to a receiver in the vehicle.

BRIEF DESCRIPTION OF THE DRAWINGS

Preferred embodiments of the invention can be understood in more detail from the following descriptions taken in conjunction with the accompanying drawings in which.

DETAILED DESCRIPTION OF THE PREFERRED EMBODIMENTS

Preferred embodiments of the present invention will be described below in more detail with reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
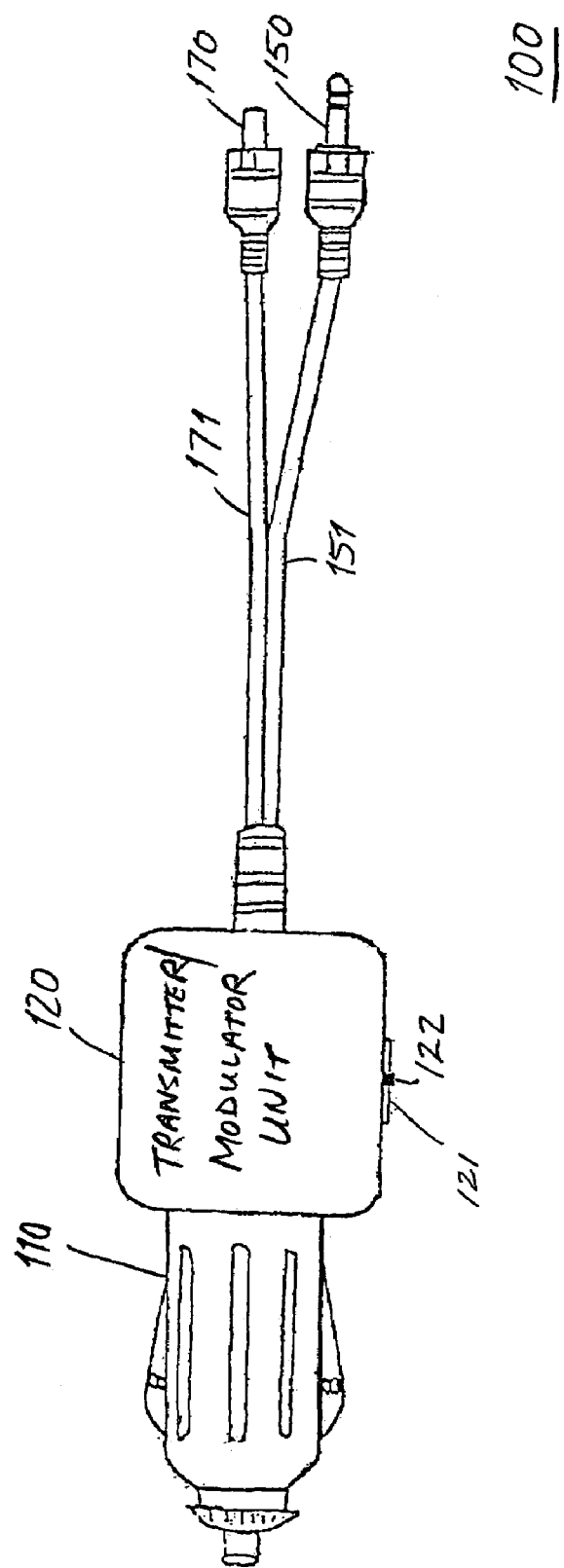
FIG. 1 shows a connecting device including a wireless transmitter, according to an embodiment of the present invention.

Referring to FIG. 1, the connecting device 100 includes power port plug 110, which can be inserted into a standard vehicle power port, such as a cigarette lighter. The connecting device 100 can transmit power from a vehicle (e.g., 12 volt DC power) to a portable entertainment device 300 (FIG. 3) through a wire 171 and a power plug 170, which can be plugged into a power port 330 of the portable entertainment device 300. The portable entertainment device 300 may include, for example, a VCD player, a DVD player, a CD player, or an MP3 player.

The connecting device 100 includes a transmitter/modulator unit 120 and a frequency selector 121. The frequency selector 121 can be tuned, using a button or a dial 122, to a desired frequency on which a wireless transmitter included in the transmitter/modulator unit 120 can transmit audio and visual signals. In one embodiment, the wireless transmitter may include a frequency modulation (FM) transmitter 625 (FIG. 4A), whereby the frequency can be in the FM band, ranging from about 88 MHz to about 108 MHz. In another embodiment, the wireless transmitter may include a digital broadcast transmitter, such as a digital audio broadcast (DAB) transmitter 627 (FIG. 4B), which can transmit on frequencies in and beyond the FM band, ranging from about 88 MHz to about 225 MHz. Frequency may be tunable to a number of frequencies in the ranges in increments of 0.1 MHz. The wireless signals are transmitted to, for example a vehicle antenna.

Wireless audio and visual signals can be broadcast, for example, through an FM radio including a display for visual information, such as text, graphics or video. With the embodiment using the DAB transmitter 627, transmission of the visual and audio signals may be to a digital radio in a vehicle capable of displaying more visual information than a traditional FM radio. The audio and visual signals may also be broadcast to a display unit capable of playing audio. The FM and digital radios and the display unit are coupled to the vehicle's antenna and tuned to the frequency on which the audio and visual signals are transmitted. The audio and visual signals may be stored, for example, on a DVD, VCD, CD, or a computer file, such as an MP3 file. The visual signals are signals pertaining to the stored program to be played and may include text, graphics or video, including, for example, information such as names of songs and artists, icons, and movie data, including name of the movie, director, and scene information. The visual signals may be synchronized with audio and video signals.

Figure 2:
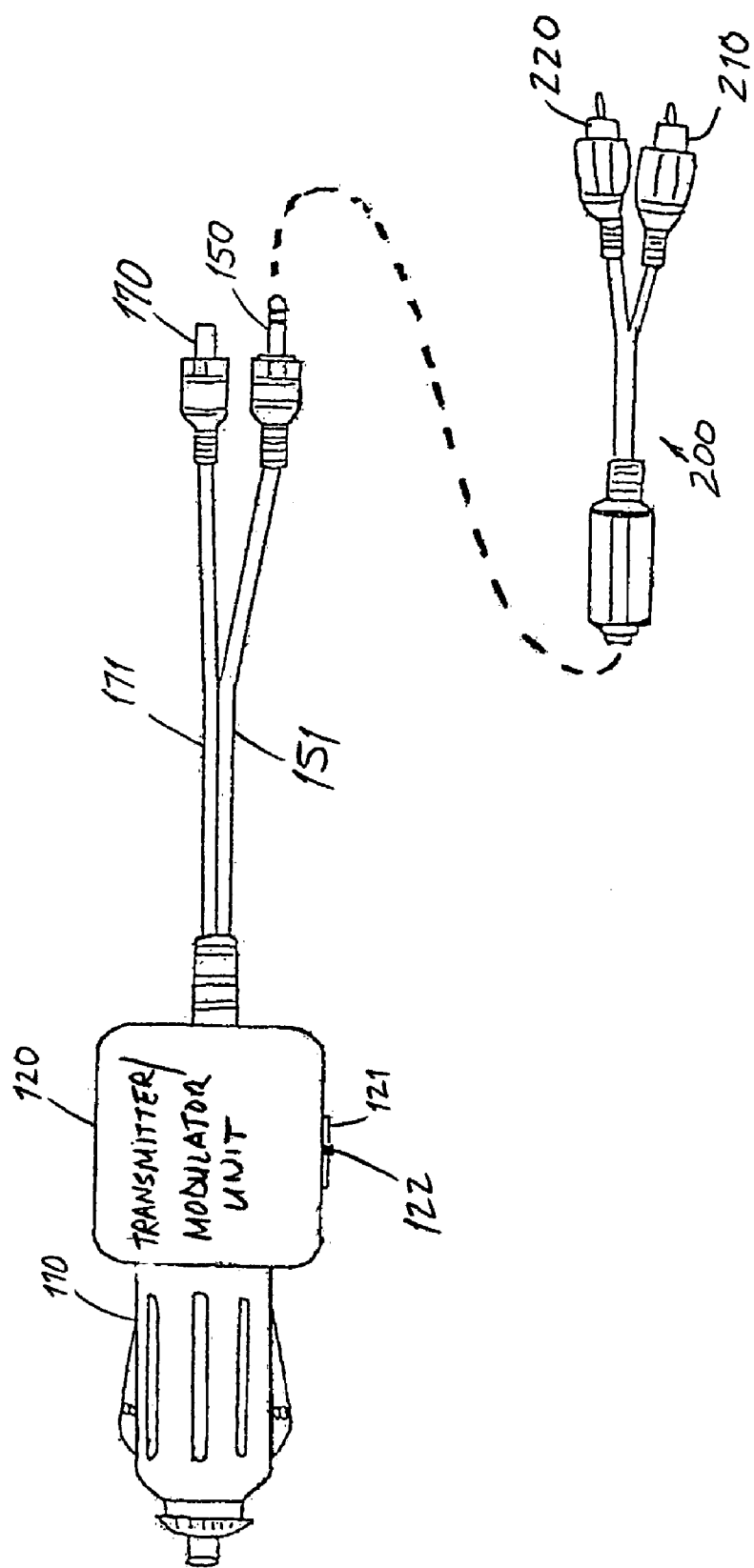
FIG. 2 shows the connecting device of FIG. 1 and a patch cord connectable thereto, according to an embodiment of the present invention.
Figure 3:
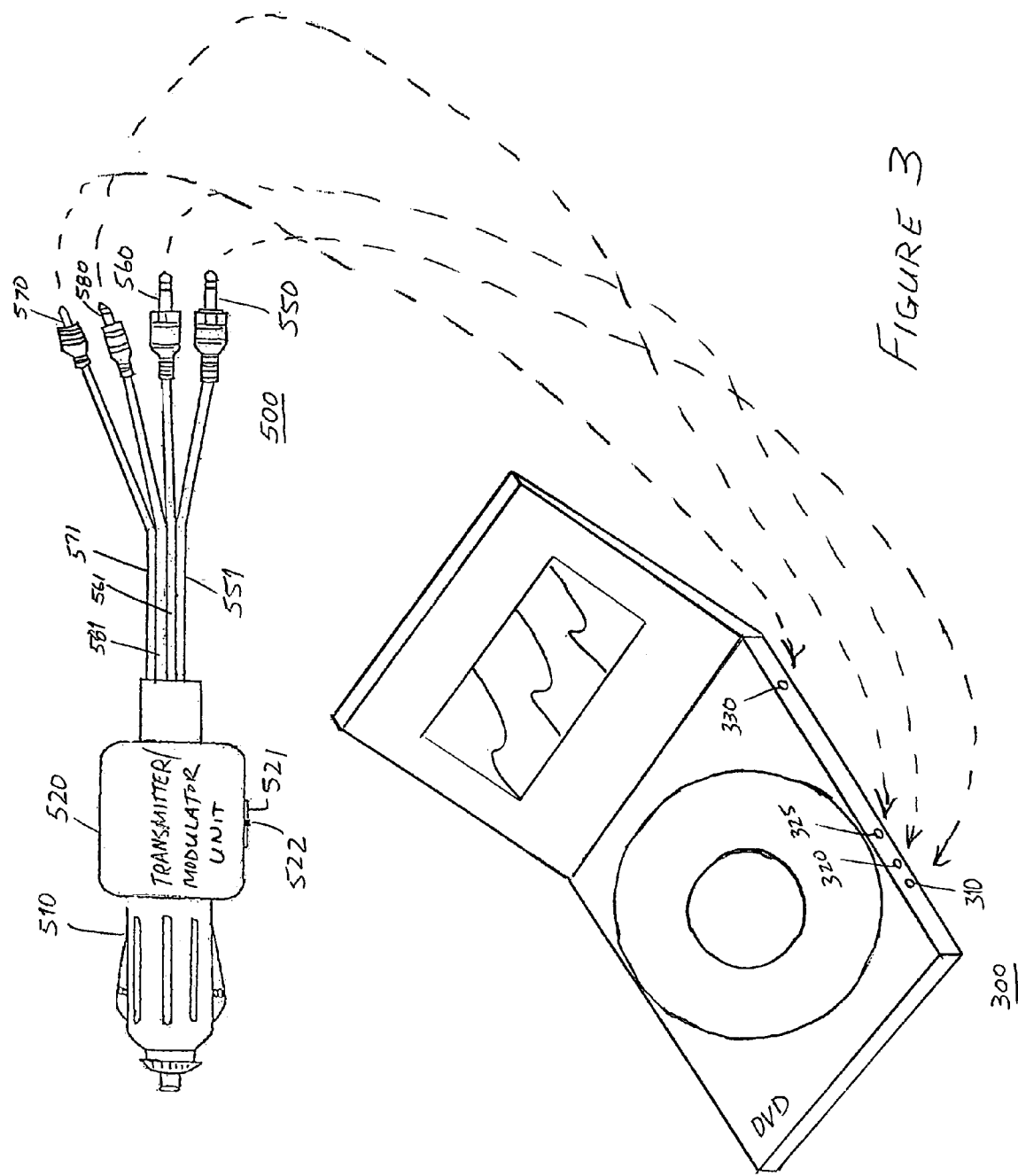
FIG. 3 shows a connecting device including a wireless transmitter and a portable entertainment device connectable thereto, according to an embodiment of the present invention.

As shown in FIGS. 1-3, different configurations may be used for supplying audio and visual signals to the wireless transmitter 120. For example, as shown in FIG. 1, a plug 150 may connect directly to an audio output port of a portable video or audio player, such as a DVD, VCD, CD or MP3 player, and transmit audio and visual signals to the transmitter/modulator unit 120 via wire 151. A modulator 623 (FIGS. 4A-4B) included in the transmitter/modulator unit 120 then modulates the audio and visual signals for transmission on the selected frequency for receipt by and broadcast through a display unit and/or radio coupled to the vehicle's antenna.

Alternatively, as shown in FIG. 2, the plug 150 can connect to a patch cord 200 including plugs 210 and 220. The plugs 210, 220 can connect to multiple audio output ports, for example ports 310 and 320 of a portable video player 300. The ports may be, for example, left and right headphone ports that carry both audio and visual signals.

Alternatively, the portable video player 300 also may be equipped with a video output port 325 through which the visual signals are transmitted. It is to be understood that the portable player 300 may include one or multiple audio output ports carrying just audio or both audio and visual signals. In addition to the audio output ports, the player 300 may include a video output port capable of transmitting visual signals.

In a configuration including a player with a video output port, plugs 210 and 220 may connect to audio and video output ports, respectively, whereby audio signals are transmitted through the audio output port and visual signals are transmitted through the video output port. Therefore, audio and visual signals can be carried via the patch cord 200, plug 150 and wire 151 to the transmitter/modulator unit 120.

The modulator 623 then modulates the visual and audio signals on the selected frequency and transmits the signals for receipt by and broadcast through an entertainment device in a vehicle, such as a radio with a digital display, wherein the entertainment device is coupled to the vehicle's antenna.

Referring to FIG. 3, a connecting device 500, like the connecting device 100, includes a power port plug 510, a transmitter/modulator unit 520 with a frequency selector 521 having a button or dial 522. Power from the vehicle can be supplied to the portable entertainment device 300, for example, a portable DVD player, via the power port plug 510, wire 571 and plug 570, which is inserted into power port 330.

Audio signals from the portable player 300 are supplied to the transmitter/modulator unit 520 from output ports 310, 320, which receive plugs 550 and 560, respectively. Visual signals from the portable player 300 are supplied to the transmitter/modulator unit 520 from output port 325, which receives plug 580. The visual and audio signals are transmitted to the transmitter/modulator unit 520 through wires 581, and 551 and 561, respectively. A wireless transmitter, for example, an FM or DAB transmitter included in the transmitter/modulator unit 520, then transmits the visual and audio signals on a selected frequency for receipt by and broadcast through an entertainment device in a vehicle, such as radio with a digital display, wherein the entertainment device is coupled to the vehicle's antenna.

In operation, when plug 110/510 is plugged into a vehicle's power port, a voltage (e.g., 12 volts DC) is processed, by, for example, a voltage circuit included in the transmitter/modulator unit 120/520, to output a constant voltage. The constant voltage is supplied to the power port 330 of the player 300 via plug 170/570.

Figure 4A:
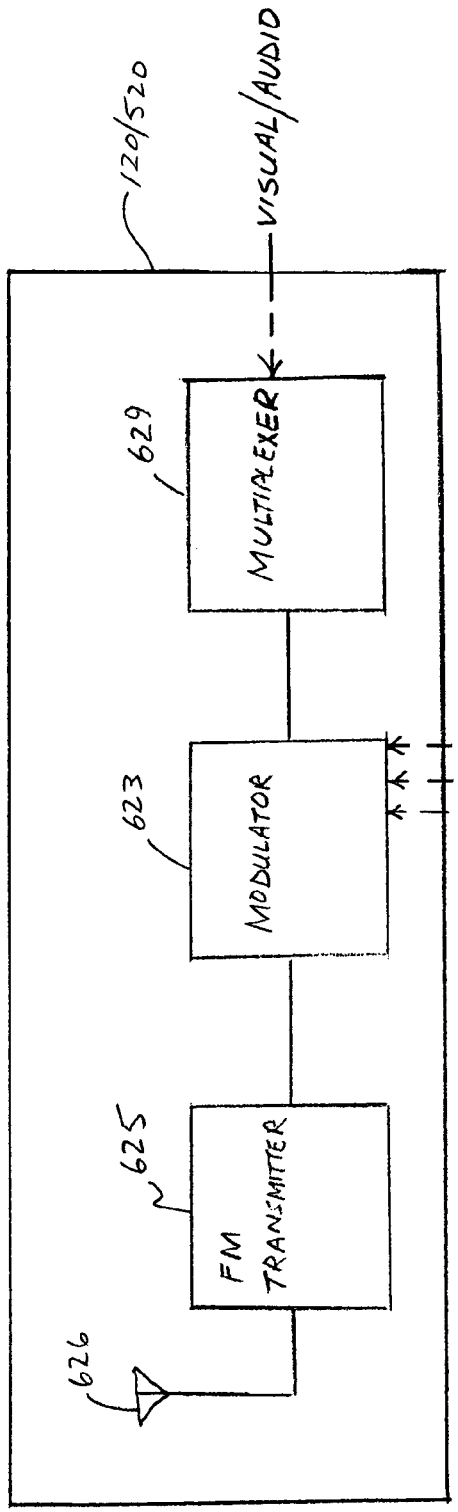
FIG. 4A shows a block diagram of transmitter/modulator unit for use with a connecting device, according to an embodiment of the present invention.
Figure 4B:
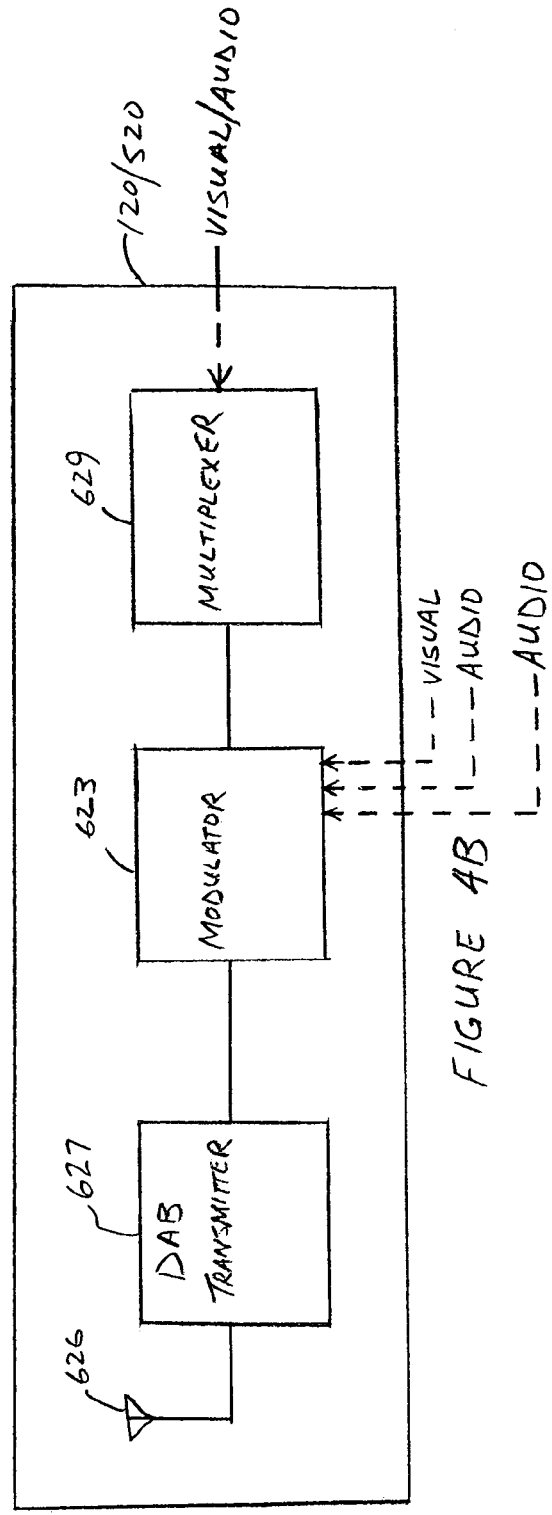
FIG. 4B shows a block diagram of transmitter/modulator unit for use with a connecting device, according to an embodiment of the present invention.

Referring to FIGS. 4A-4B, a transmitter/modulator unit 120/520 may include a multiplexer 629 for multiplexing the visual and audio signals received, for example, on a single wire, such as wire 151/551 and/or wire 561. The multiplexer 629 converts the visual and audio signals into an appropriate form so that they can be modulated onto a chosen frequency by a modulator 623, for example an FM or DAB modulator included in the transmitter/modulator unit 120/520. Using the FM or DAB transmitters 625, 627, a modulated signal can be wirelessly transmitted via an antenna 626 to a vehicle antenna. Alternatively, audio and visual signals can be sent directly to the modulator 623, for example, from wires 551 and 561, and 581, respectively, without processing by the multiplexer 629.

Once received by the vehicle's antenna, a modulated signal is received by an entertainment device in the vehicle, such as a radio, which is tuned to the chosen frequency. The audio and visual signals are then demodulated by a demodulator and are respectively output to speakers and a display of the entertainment device.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A connecting device, comprising:
    a first power plug for connecting to a power output port of a vehicle;
    a second power plug for connecting to a power input port on an electronic device;
    at least one signal plug for connecting to at least one signal output port of the electronic device, wherein visual signals and audio signals are received by the connecting device through the at least one signal plug;
    a wireless transmitter for wirelessly transmitting the visual signals and the audio signals to a receiver in the vehicle, wherein the visual signals include video;
    a multiplexer for multiplexing the audio signals and the visual signals; and
    a modulator having input connections to receive the visual and audio signals via and not via the multiplexer, wherein, when the modulator receives the visual and audio signals via the multiplexer, the modulator modulates the multiplexed visual signals and audio signals onto a predetermined frequency for wireless transmission at the predetermined frequency, and wherein, when the modulator receives the visual and audio signals not via the multiplexer, the modulator modulates the visual and the audio signals not transmitted via the multiplexer.

2. The connecting device as recited in claim 1, wherein power from the vehicle is supplied to the power input port of the electronic device via the first power plug and the second power plug.

3. The connecting device as recited in claim 1, wherein the electronic device is at least one of a digital video disc player, a video compact disc player, or an MP3 player.

4. The connecting device as recited in claim 1, wherein the visual signals and the audio signals are stored on at least one of a digital video disc, a video compact disc, or a computer file.

5. The connecting device as recited in claim 1, wherein the visual signals are synchronized with at least one of the audio signals or video signals.

6. The connecting device as recited in claim 1, further comprising a frequency selector for selecting the predetermined frequency.

7. The connecting device as recited in claim 6, wherein the receiver is tuned to the selected frequency.

8. The connecting device as recited in claim 1, wherein the receiver is a display unit coupled to an antenna of the vehicle.

9. The connecting device as recited in claim 1, wherein the receiver includes a display for displaying visual information derived from the visual signals transmitted by the wireless transmitter.

10. The connecting device as recited in claim 1, wherein the wireless transmitter includes a digital broadcast transmitter.

11. A connecting device, comprising:
    a means for connecting to a power supply of a vehicle;
    a first means for connecting to an electronic device, whereby power is supplied from the power supply to the electronic device;
    a second means for connecting to the electronic device, whereby visual signals and audio signals from the electronic device are received by the connecting device;
    a digital transmission means for wirelessly transmitting the visual signals and the audio signals to a receiver in the vehicle, wherein the visual signals include video;
    a means for multiplexing the visual signals and the audio signals; and
    a means for modulating the visual signals and the audio signals having input connections to receive the visual and audio signals via and not via the means for multiplexing, wherein, when the means for modulating receives the visual and audio signals via the means for multiplexing, the means for modulating modulates the multiplexed visual signals and audio signals onto a predetermined frequency for wireless transmission at the predetermined frequency, and wherein, when the means for modulating receives the visual and audio signals not via the means for multiplexing, the means for modulating modulates the visual and the audio signals not transmitted via the means for multiplexing.

12. The connecting device as recited in claim 11, wherein the electronic device is at least one of a digital video disc player, video compact disc player, or an MP3 player.

13. The connecting device as recited in claim 11, wherein the visual signals and the audio signals are stored on at least one or a digital video disc, a video compact disc, or a computer file.

14. The connecting device as recited in claim 11, wherein the visual signals are synchronized with at least one of the audio signals or video signals.

15. The connecting device as recited in claim 11, further comprising a means for selecting the predetermined frequency.

16. The connecting device as recited in claim 15, wherein the receiver is tuned to the selected frequency.

17. The connecting device as recited in claim 11, wherein the receiver is a display unit installed in the vehicle.

18. The connecting device as recited in claim 11, wherein the receiver includes a display for displaying visual information derived from the visual signals transmitted by the wireless transmitter.

19. The connecting device as recited in claim 11, wherein the transmission means includes a digital broadcast transmitter.

20. A wireless transmitter for use in a vehicle, comprising:
a connector for connecting to an output port of an electronic device, wherein the wireless transmitter receives audio signals and visual signals through the connector;
a multiplexer for multiplexing the audio signals and the visual signals; and
a modulator having input connections to receive the visual and audio signals via and not via the multiplexer, wherein, when the modulator receives the visual and audio signals via the multiplexer, the modulator modulates the multiplexed visual signals and audio signals onto a predetermined frequency for wireless transmission at the predetermined frequency, and wherein, when the modulator receives the visual and audio signals not via the multiplexer, the modulator modulates the visual and the audio signals not transmitted via the multiplexer; and
a digital broadcast transmitter for wirelessly transmitting the modulated audio signals and the visual signals to a receiver in the vehicle, wherein the visual signals include video.

21. The connecting device as recited in claim 1, wherein the wireless transmitter includes a digital broadcast transmitter.

* * * * *